May 8, 1928. 1,668,824
O. G. SIMMONS
TAPE ACTUATED WEDGING MEANS FOR USE IN GEAR GRINDING MACHINES
Filed Jan. 27, 1927 7 Sheets-Sheet 2
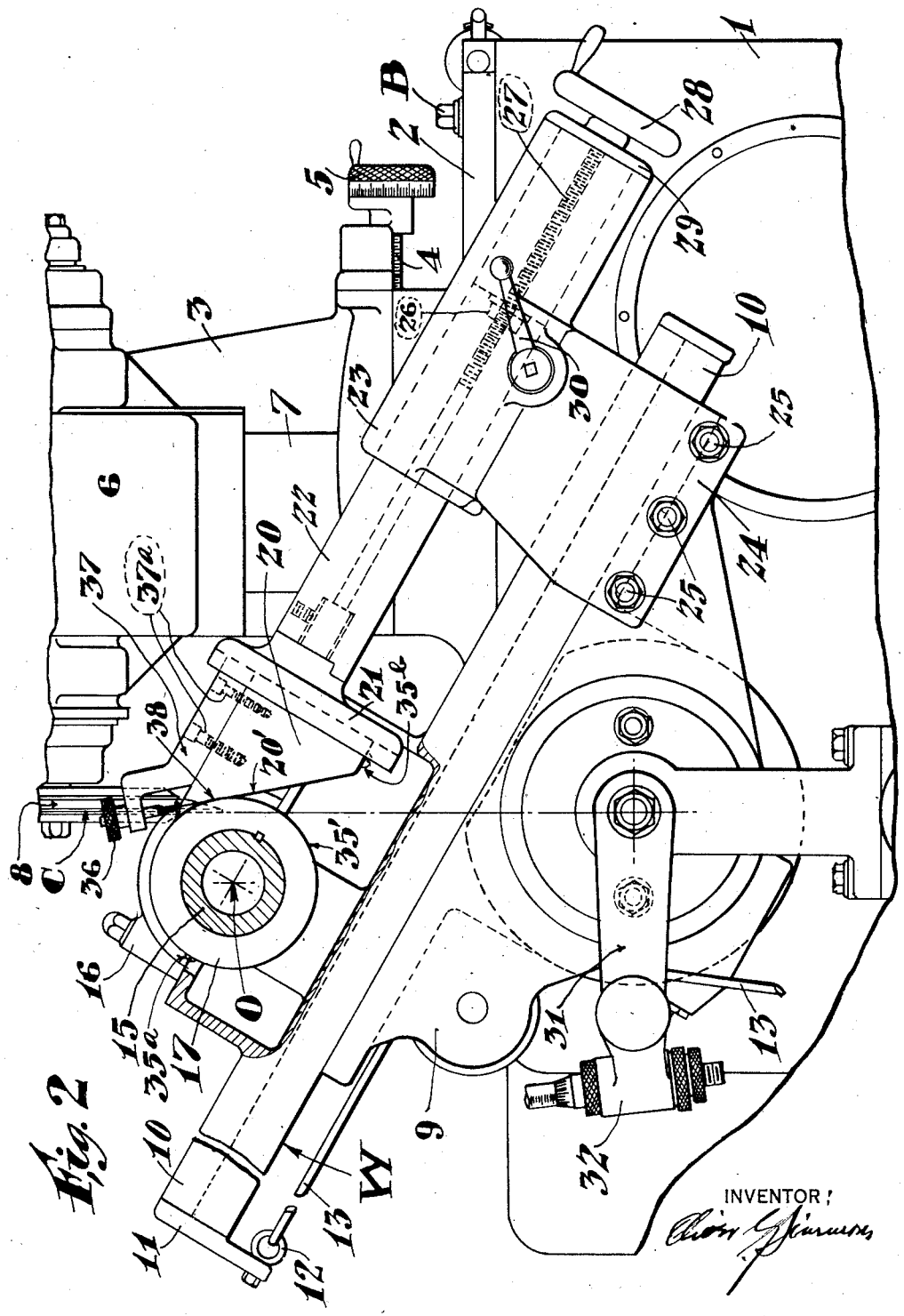
INVENTOR

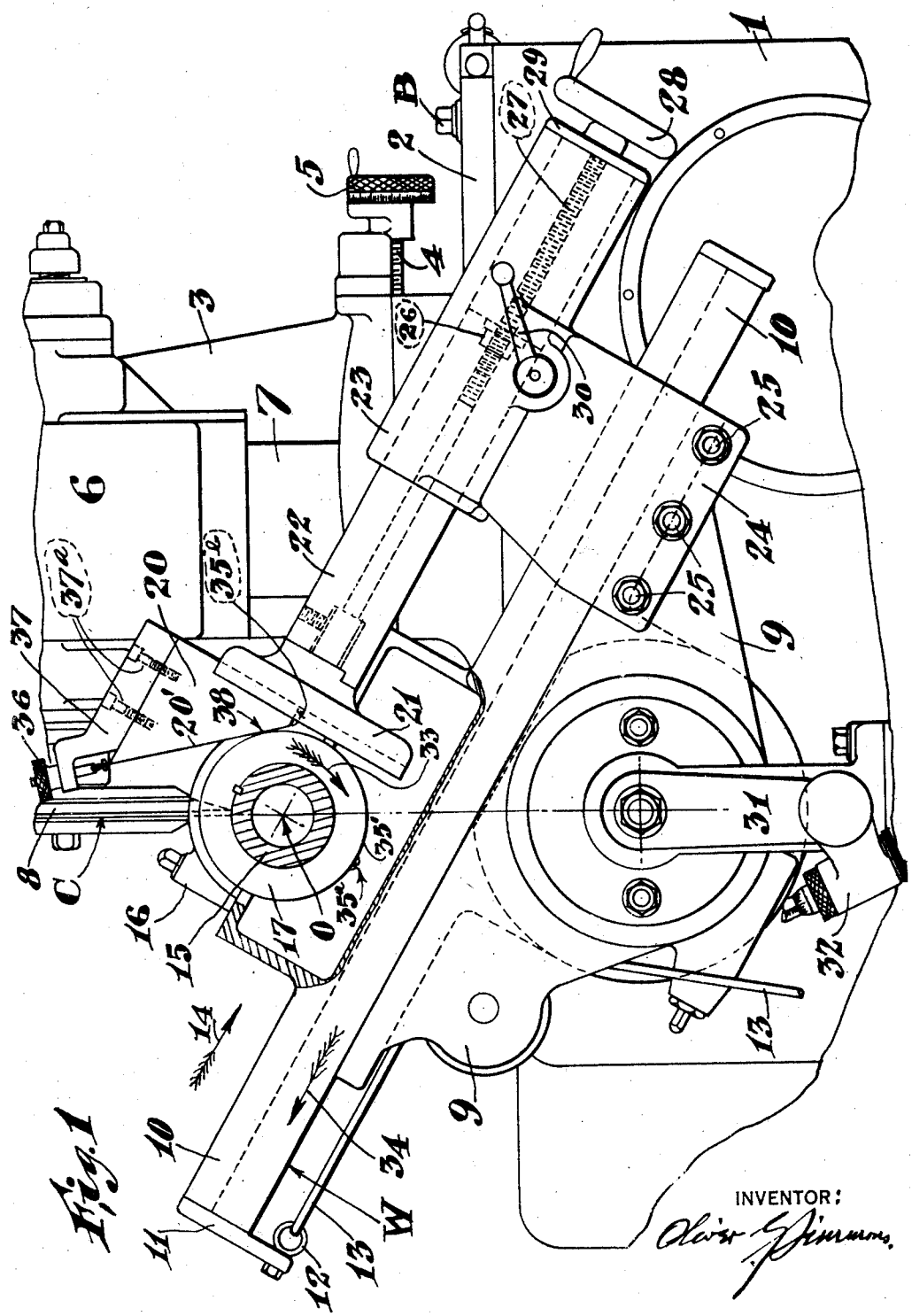

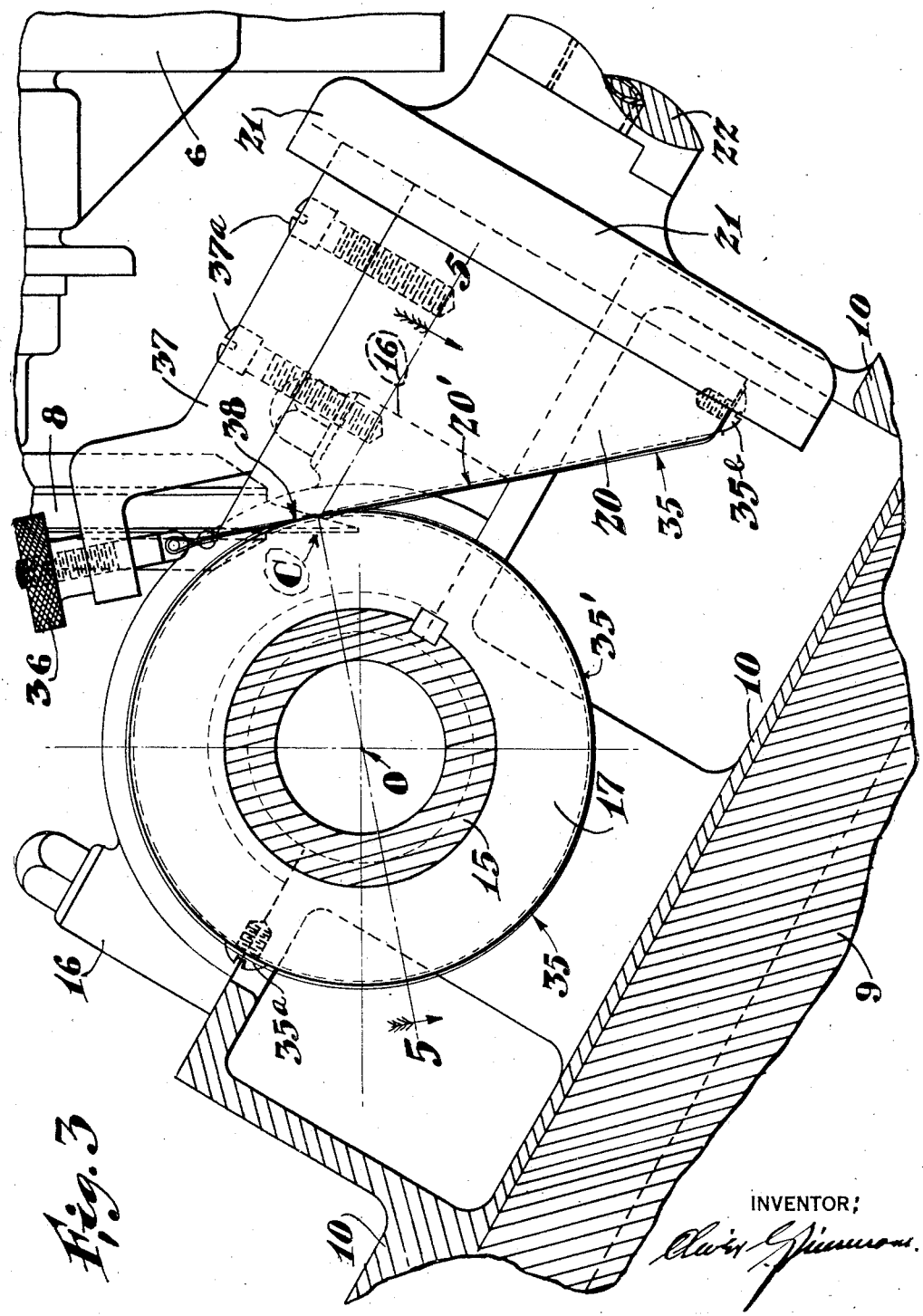

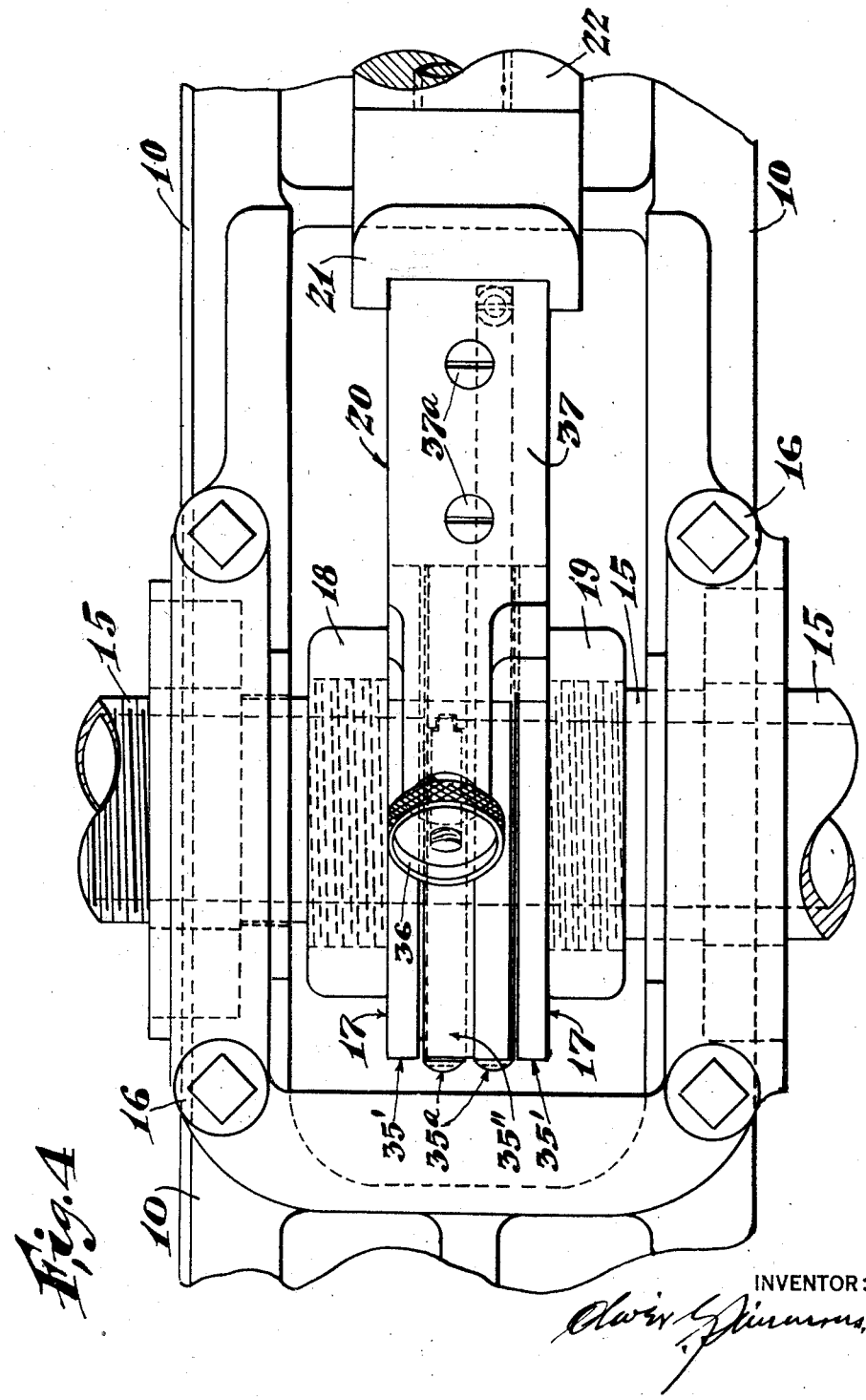

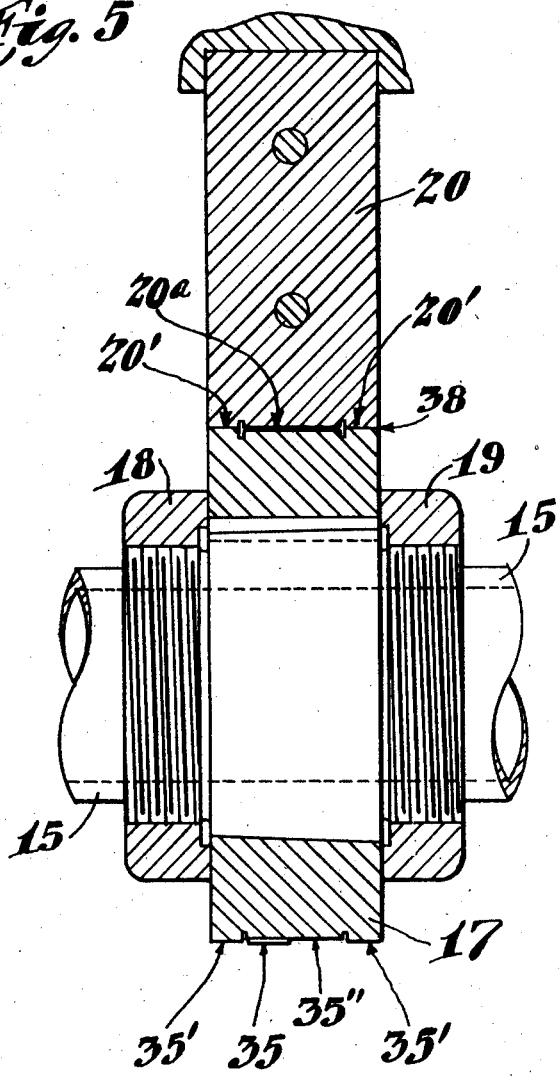

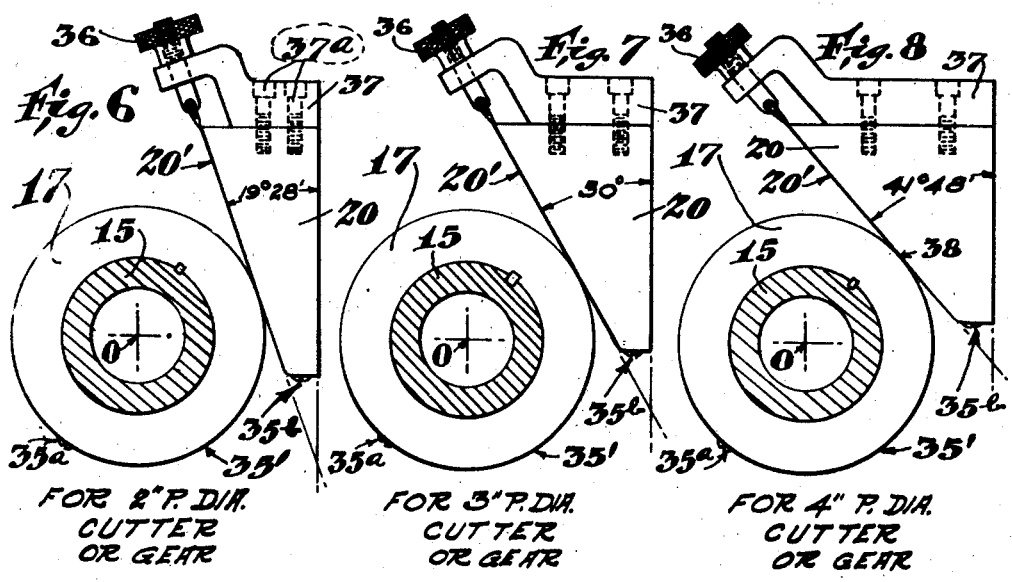

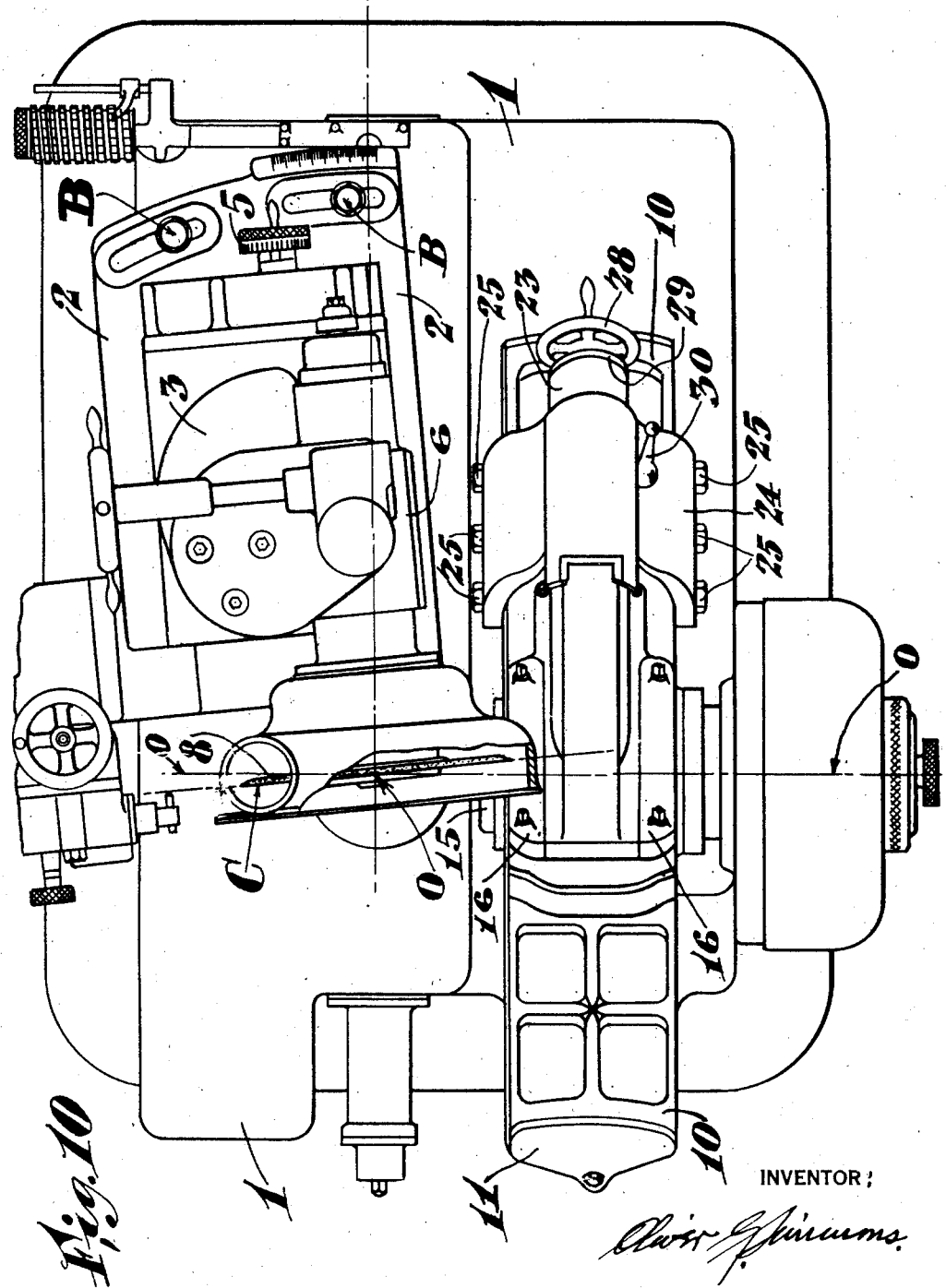

Patented May 8, 1928.

1,668,824

UNITED STATES PATENT OFFICE.

OLIVER G. SIMMONS, OF LAKEWOOD, OHIO.

TAPE-ACTUATED WEDGING MEANS FOR USE IN GEAR-GRINDING MACHINES.

Application filed January 27, 1927. Serial No. 163,868.

My invention relates to tape actuated wedging means for use in gear grinding machines and the like for actuating the work carrying slide uniformly with the oscillating motion of the work spindle carried by said slide to a given pitch circle diameter or to a given base circle diameter to produce the true curvature of predetermined form on the teeth of gears and gear shaped cutters.

The invention as disclosed in this specification and as illustrated in the drawings to be referred to later is shown as applied to machine described and illustrated in my application for Letters Patent of the United States for method of and machine for grinding the teeth of gears and gear shaped cutters, Serial No. 98,791, filed March 31st, 1926.

In my application for patent, Serial No. 131,885, filed August 27th 1926, there is shown a gear member mounted on the work spindle and adapted to mesh with a rack member so that as the work spindle is rotated the rack will cause the slide to move in a rectilinear path, the pitch line of said rack forming an angle with the rectilinear path of travel of the slide. In the present invention a work spindle has been provided, carried by a slide member with a disc member adapted to roll on a wedge member by means of tapes; one end of which is secured to the disc member, the other end of which is secured to the wedge member. The tape members are in multiple and arranged to oppose each other so that as the work spindle is rotated the wedge member will cause the slide to move in a rectilinear path, the angular face of said wedge member forming an angle with the rectilinear path of travel of the slide.

In a machine for grinding the teeth of gears and gear shaped cutters and all kindred articles of manufacture where the greatest precision is required it is essential that the interrelation of the movement of the slide with respect to the oscillating motion of the work spindle carried by the slide be correlated positive and of precise magnitude.

The main object of the present invention therefore is to provide correlated, positive mechanical means of precise magnitude for machines adapted to generate the curved teeth of gears, gear shaper cutters and all kindred articles of manufacture.

Other objects of the invention reside in the means for controlling the measure of the magnitude of movement of a slide in a rectilinear path by reciprocating a member in a plane disposed at an angle to the plane of the rectilinear movement of the slide; of a source of power applied to the work spindle or work spindle sleeve member by which said member is given said reciprocating movement by means of a disc member fixedly secured to said work spindle sleeve member connected to a wedge member which wedge member is adapted to reciprocate as the work spindle member reciprocates; said wedge member having a face connected to said disc member said connection being in the form of tapes; means to support said slide upon a swivelling member adapted to be disposed to the complemental angle of pressure with respect to a cutting element when operating on the moulding generating principle of action and in a position whereby the rectilinear path of travel of said slide will be in a plane perpendicular to said cutting element when operating on the describing generating principle of action. A member fixedly secured to said swivel member and adjustable means connected with said fixed member having a member connected thereto forming an abutment upon which a tape member in the form of a wedge is adapted to slide; means to actuate said adjustable member whereby the axis of the work spindle journalled transversely in said slide is adapted to be adjusted with respect to the cutting element; means to securely fix said adjustable member in said adjusted position; means to dispose the plane of the cutting element parallel to the axis of the work spindle, when grinding spur gears, and to an angle thereto when grinding helical and helically disposed teeth of helical gear shaper cutters, or to the small angle of clearance required when grinding gear shaper cutters adapted to cut the teeth of spur gears in the Fellows gear shaper; means exerting a constant force to the slide in one direction and independent means connected to the work spindle and to the aforesaid wedge member to take the force aforesaid; of the correlation of the oscillating movement of the work spindle and rectilinear movement of the slide said correlation being fixed so that if the movement of the work spindle is uniform the movement of the slide will be uniform, and vice versa, if the movement of the work is nonuniform the movement of the slide will be nonuniform. These movements being correlated, the ratio of the rectilinear movement of the slide and the rotary movement of the work spindle will bear the same relation, so that if one movement is accelerated and then decelerated, so also will the other one be accelerated and decelerated in the same correlated ratio.

A still further object of the invention is to provide, when the machine is operating on the moulding generating principle of action, which may be stated as being the preferred principle of action because of its adaptability by means of adjustment referred to, that the wedge member be provided with the angle A with respect to the disc member and connecting tape members determined by the following equation:

Sine of angle A equals $\frac{a}{c}$ in which $a$ equals the circumference of the pitch circle of work or cutter and $c$ equals the pitch circumference of disc member on the work spindle.

By pitch circumference of disc member, it must be understood that since there are interposing members in the form of tapes between the disc member and the wedge member, the thickness of the tapes must be taken into consideration when the actual diameter of the disc member is determined. For example, let it be assumed that the disc member is six inches diameter. This disc in rolling on the inclined plane of the wedge member without slippage will cause the inclined surface of the wedge member to move with respect to said disc, the measure corresponding to the diameter of the disc multiplied by $pi$ for one turn of the disc, whereas a disc member of six inches diameter adapted to engage the inclined surface of a wedge member through the medium of tape members herein referred to will cause the inclined surface of the wedge member to move a measure of distance for each turn of the disc member equal to the actual diameter of the disc member, which is given as six inches for purpose of this example, plus the thickness of the tape members times $pi$. It is obvious from this, therefore, in the practice of this invention, that the actual diameter of the disc member on the work spindle must have the thickness of tape member subtracted from it after determining pitch circumference in accordance with equation above referred to. It must also be understood when the invention herein disclosed is adjusted to operate on the describing generating principle of action that the pressure angle of the work will be zero and the slide will be set normal to the cutting element (at right angles thereto) and the base circle will be considered as also the pitch circle. The above equation, therefore, will hold true whether the machine operates on the describing generating or on the moulding generating principle of action.

With the above and other objects in view the invention comprises the means attained by structure illustrated in the accompanying drawings hereinafter described and particularly set forth in the appended claims, together with such variations and modifications thereof as will be apparent to those skilled in the art to which the invention apertains. Reference should be had to the accompanying drawings forming a part of this specification.

Fig. 1 is a front view in elevation of a portion of a well known gear and gear shaped cutter grinding machine, partly in fragmentary section, showing the present invention and its application to that machine.

Fig. 2 is similar to Fig. 1 except in this view the slide is shown at the other end of its stroke.

Fig. 3 is an enlarged view in sectional elevation of the present invention.

Fig. 4 is a plan view showing fragmentary portions of the slide, work spindle and adjustable member with the cover removed therefrom, and the arrangement of the present invention with respect to these parts.

Fig. 5 is a section 5—5 of Fig. 3 looking in the direction of the arrow.

Fig. 6 is a front elevation of the disc member and wedge member and the interposed tape members showing the wedge member as it will appear for a two inch pitch diameter cutter or gear. Part of the work spindle is shown in section.

Fig. 7 is similar to Fig. 6 except that the wedge member is shown for a three inch pitch diameter cutter or gear.

Fig. 8 is also similar to Fig. 6 except in this view the wedge member is shown as it would be designed for a four inch pitch diameter cutter or gear.

Fig. 9 illustrates the trigometrical functional relation of the pitch circle of the work on the work spindle and the measure of the periphery of the disc member secured to the work spindle and the resultant algebraic equation in the lower left hand corner of the sheet.

Fig. 10 is a top plan view of the machine.

The numeral 1 indicates the bed of the machine upon which is mounted upright swivel base 2. The upright 3 is adapted to engage the slide on swivel base 2 through the medium of V-ways, not shown, by means of the screw 4 having threaded engagement with swivel base 2, the hand-wheel 5 being secured to said screw 4. The adjustable vertical slide 6 is adapted to engage the V-ways 7 on the upright 3. The cutting element 8, which may be an abrasive wheel or a milling cutter, is carried by a spindle in the slide 6. The cutting element 8 may be rotated by any suitable means. Swivel member 9 is adjustably mounted on a bearing carried by and fixedly secured to bed 1. Slide 10 engages V-ways on swivel member 9 and is adapted to move in a rectilinear path thereof. The end plate 11 is secured to the end portion of the slide 10, to which is fixedly secured the eye-bolt 12, through which the cable 13 is passed. The other end of the cable 13 has a weight attached which causes the slide 10 to exert force in the direction of the arrow 14.

The work sleeve spindle 15 is journalled in a portion of the slide 10 by means of the bearing caps 16. The disc 17 is fixedly secured to the work sleeve spindle 15 and held in place on said member by means of the nuts 18 and 19, see Fig. 4, which have threaded engagement with the work sleeve spindle 15.

The wedge member 20, see Fig. 1, has tangential engagement 38 with disc 17 as shown, and is adapted to engage and slide in a rectilinear path on the abutment 21, said abutment being secured to adjustable tail stock member 22 carried by the fixed tail stock member 23, said tail stock member being fixed with respect to swivel member 9. The lower portion 24 of said tail stock member straddles the slide member 10 and is fixedly secured to said swivel member 9 by means of the cap screw bolts 25. The nut 26 is fixedly secured to one end of the tail stock spindle 22 and has threaded engagement with the screw 27 to which is also secured the hand-wheel 28. The flange 29, forming the necessary shoulder bearing for said screw 27, will cause tail stock spindle 22 to move in or out of the tail stock 23 as the hand-wheel 28 is rotated one way or the other way for a purpose to be later described, and when so adjusted to a given position, the tail stock spindle 22 may be fixedly secured in said position by means of the clamping handle 30. The action of the clamping member 30 to lock tail stock spindle 22 to tail stock 23 is well known in the art and no other detailed description is thought to be necessary. It is obvious that as tail stock spindle 22 is moved to the left or right of the person viewing the drawing, the slide 10 will be moved in accordance therewith, inasmuch as it will later be shown that since disc member 17 cannot rotate, except as it is rotated in an oscillating manner to be later described, the slide 10 will be given an additional rectilinear movement of adjustment to the right or left of the person viewing the drawing, which movement is independently of other rectilinear movement of the slide.

Bed 1, swivel base 2, upright 3, slide 6, cutting element 8, swivel 9, slide 10, plate 11, eye-bolt 12, cable 13, tail stock spindle 22, tail stock 23 and its fixed position with respect to swivel member 9, form a part of the subject matter for my application for patent, Serial No. 98,791, filed March 31st, 1926, previously referred to, and is, therefore, no part, per se, of the present invention.

The work sleeve spindle 15 of the present invention is actuated to oscillate by means of the bell crank 31 and connecting rod 32 from a source of power fully set forth in application for patent previously referred to. In the present invention it is believed suffice to say, therefore, see Fig. 1, that as the work spindle 15 is rotated in the direction of the arrow 33, the disc member 17 will cause the wedge member 20 to move by means of a plurality of tapes 35, which tapes are preferably made of steel of a given thickness and which are, therefore, inextensible and operable as later referred to.

One tape 35 is secured to the disc member 17 by means of the button head screw 35$^a$ at one end, and at the other end to the wedge member 20, by means of the button-head screw 35$^b$. Another tape is secured to disc member 17 as referred to, the other end of which is secured to the wedge member 20, by means of the adjustable screw member 36, carried by the arm 37, which arm is fixedly secured to said wedge member 20, by means of the fillister head cap screws 37$^a$. This is shown in Figs. 1 and 2 and again to an enlarged scale in Fig. 3, in plan view Fig. 4 and in sectional view Fig. 5, as well as being very clearly shown in Figs. 6, 7 and 8.

The plurality of tapes are shown opposed to each other. If but two tapes are used as shown on the drawings forming a part of this specification, one tape being secured by means of the button-head screw 35$^a$ will partially surround the disc member 17 in a clockwise direction and be secured to said wedge member 20 by means of the button-head screw 35$^b$, whereas, the other tape member being secured by means of the button-head screw 35$^a$ partially surrounding the disc member 17, moving from the button-head screw 35$^a$ in an anticlockwise direction, will lie upon and be in contact with the angular surface 20$^a$ of the wedge member 20, and fixedly secured to the adjustable screw member 36 to enable the workmen to tension the tape members 35. This is done through the medium of the adjustable screw member 36.

The movement of the work spindle 15 to cause the wedge member 20 to move through the medium of the tape members 35, as previously referred to in a general way, and now more specifically; if the work spindle 15 is rotated in the direction of the arrow 33, the disc member 17 will cause one of the tapes 35 to exert a force and cause the wedge member 20 to move downward, which movement will cause the slide 10 to move in the direction of the arrow 34, and lift the weight suspended on the end of the cable 13. The movement is continued to the position shown in Fig. 2, at which point the action of the bell crank 31 is reversed, whereupon the work spindle 15 will be caused to move in the opposite direction to raise wedge member 20, and to cause the slide 10, by virtue of the component parts, the gravitational force of same and the force exerted by the weight suspended on cable 13, to return to its former position as shown in Fig. 1.

It is obvious that the magnitude of the rectilinear movement of the slide 10, on swivel member 9, will depend upon the diameter of the disc 17, the thickness of the tape members 35 and the inclination of the angular surface of the wedge 20. It is also obvious that the wedge 20 will move uniformly with the work spindle disc 17, regardless of the uniformity or nonuniformity of movement of said disc. In other words, if disc member 17 is moved with a uniform velocity, wedge member 20 will be moved with a uniform velocity, and likewise slide 10 will move with a uniform velocity; and, moreover, if disc 17 is moved with a nonuniform velocity, for example; accelerated and then decelerated, the movement of the wedge member 20 will be uniform with the movement of the disc 17, but its movement with respect to the abutment will be nonuniform. Likewise, the movement of slide 10 will be nonuniform with respect to swivel member 9, but the ratio between the rectilinear movement of the slide 10, and the oscillating rotary movement of the disc 17, will be correlated therewith and therefore uniform with it and to the given ratio as previously referred to and as will be later more fully described.

In the movement of the slide it is obvious that the abutment member 21 may be moved to a position of adjustment by means of the tail stock spindle 22, independently of the movement or absence of the movement of the slide 10. It is also obvious that if no means are provided to take the thrust exerted by the weight of the slide and its apparatus, and the force of the weight suspended to cable 13, there will be a thrust component exerted between wedge member 20 and disc 17, which would have to be taken in this construction by the surface of the tapes 35. This is highly objectionable and to take care of this component the disc member 17 and the wedge 20 are constructed as follows, see Figs. 4 and 5:

Disc 17 is preferably provided with the theoretically correct pitch circle diameter at the flange portions 35' and the wedge 20 is provided with end portions 20' tangent thereto. The portions 35' therefore, and the portions 20', are adapted to coincide at the point of tangency 38, see also Fig. 1, so that the component of the force referred to is taken by said portions 35' of the disc 17 and the portion 20' of the wedge member 20, thus the function of the tape members 35 is that of the transmission of motion only as distinguished from the component of thrust exerted by the slide and the weight suspended by the cable 13. Thus a portion 35', therefore, of the disc member 17 will roll upon the inclined surface 20' of the wedge member 20 and tape members 35 will roll upon the reduced portion 35'' of the disc member 17; which portion 35'' is smaller than the theoretically correct diameter 35' by the measure of the thickness of the tape 35 selected. In like manner the portion 20$^a$ of the wedge member 20 lies in a plane removed from the plane of the surface 20' of the wedge 20 by a measure of magnitude equal to one half the thickness of tape member 35. The measure of the thickness of tape member 35 has been found from practice to be substantially .020 inch. The difference between the diameter of the portions 35' and 35'' of the disc member 17 would, therefore, be .020 inch. In like manner the measure of the difference between the parallel surfaces 20$^a$ and 20' of the wedge 20 would be one half of the thickness of the tape measure aforesaid or equal to .010 inch.

It is to be understood that a tape of any thickness may be used provided it is not so great as to preclude all possibility of the tape bending to conform to the curved periphery of the portion 35'' of the disc 17. In some older machines; for example, the Bilgram bevel gear generator, the thickness of tape is dependent upon the size of the machine. In other words, dependent upon the load the tapes are going to carry, allowance being made for a substantial factor of safety. As above stated, however, we have secured very good results from tapes one inch wide and of .020 inch thickness.

It is further of importance that the tape members 35 be truly flat and of a uniform thickness of the given size. Otherwise slight errors will occur which can be compensated for by swivelling slide member 10 on swivel 9. If the tape is thicker than the given thickness a different pressure angle may be introduced which would have to be compensated for as stated.

In the operation of the machine set forth, the connecting rod 32 and bell crank 31 determine the movement of the disc 17, and the inherent inclinations are such as to cause the wedge member 20 to exert component force in a vertical direction and always in that direction to raise same regardless of whether the slide is moved in the direction of the arrow 34, Fig. 1, or in the direction opposite to that, see Fig. 2. This becomes quite obvious by an inspection of the enlarged fragmentary sectional view of Fig. 3. The slide in this view is shown as having moved to the extreme left hand position of the person viewing the drawing.

For a further understanding of the invention reference is made to Figs. 6, 7, 8 and 9 which embody some concrete examples.

If it is desired that the cutting element 8 generate true involute curved profiles on the face of the teeth of the work there are two principles of action by which this may be accomplished in the present invention as it is applied to the machine referred to. The difference between each principle of action may be briefly stated to reside in the following:

In the describing generating principle of action the pressure angle is not considered since it is zero, and the rectilinear path of movement of the slide will be in a plane at right angles to the face C, Figs. 1, 2 and 3, of the cutting element 8, and the actual effective portion of the face C of the cutting element 8 lies in a given tangential point of contact between said cutting face C and the involute normal to said face; said face, therefore, is of mathematical necessity when operating on this principle of action, perpendicular to the rectilinear path of movement of slide 10; whereas, in the moulding generating principle of action, the rectilinear path of movement of the slide 10, is disposed at an angle to the face C of the cutting element 8, corresponding to the pressure angle of the involute desired, in which the actual effective portion of the cutting element 8, will lie across the face C, and not only at a tangential point of contact as in the describing generating principle of action.

The two principles of action herein referred to are fully set forth in the book "Gear Cutting Machinery" by Ralph E. Flanders, published by John Wiley & Sons, New York. It may be stated further that in the describing generating principle of action, as it should be practiced in the machine herein referred to, in the invention set forth, when operating on the describing generating principle of action the base circle is to be considered as also the pitch circle and the swivel member 9 should be set at zero pressure angle as referred to, and when operating on the moulding generating principle of action, the pitch circle may be selected and the swivel member 9 swivelled to a pressure angle determined by any base circle smaller than the pitch circle referred to.

Let it be assumed that we desire to grind true involute curves on the teeth of the work having a 2" pitch diameter. Fig. 6 indicates that the angle of the wedge member 20 is 19° 28'. If then the swivel is set at zero, normal to the face C of the cutting element 8, a true involute curve to a 2" evolute or base circle will be generated on the face of the tooth of the work. If, however, it is desired that the work have a pressure angle resulting in an evolute or base circle smaller than the 2" circle above referred to for which the wedge, shown in Fig. 6, having an angle of 19° 28' is adaptable, it is only necessary to set swivel member 9 to the selected pressure angle, whereupon the involute determined by the base circle smaller than 2" diameter will be generated, and the diameter of this evolute or base circle will be determined by the following equation.

The pitch circle diameter for which the wedge member has been adapted times the cosine of the pressure angle will give the base circle diameter. For example, in Fig. 6 the wedge member 20 is shown as having been adapted for 2" pitch diameter cutter. Let it be assumed that the pressure angle of the gear or cutter to be ground having true involute curves is equal to 20°. Two times the cosine of 20° therefore will give the diameter of the evolute or base circle. This is more fully set forth in my article "The law of the involute" published in American Machinist issues of November 23rd and 30th, 1922. In like manner Fig. 7 indicates that the angle of the wedge member 20, for a 3" pitch diameter cutter or gear is 30°, and likewise in Fig. 8, the angle of the wedge member 20, is 41° 48' for a 4" pitch diameter cutter or gear. It is understood from the foregoing that any pressure angle within the capacity of the machine may be used by simply setting the swivel member 9 to that pressure angle without change of parts, it being merely a matter of adjustment to the swivel 9 as referred to. The diameter of the disc 17 may be arbitrarily selected and determined upon by the size of the work, and it will be noted that with reference to Figs. 6, 7 and 8, the same size disc is used. This disc can be selected of such size so as to enable all size gears and cutters, within the rated capacity of the machine, to be ground without change of parts except substitution of one wedge member 20 for another of greater or lesser degree of inclination.

Fig. 9 is a graphical illustration of the trigometrical method by which the angle A is determined. It must be borne in mind that there are two principles of action and three methods by which involute curves on the face of teeth of cutters or gears may be generated. One method involves the movement of a point, another the movement of an inclined plane, the other and last, the movement of an involute curve itself. The first comes within the scope of describing generating whereas the last two are moulding generating. Since the cutting element 8 is provided with the cutting face C, which is a plane, we are concerned only with the two methods first mentioned. This is to say, the point and the inclined plane. These methods are graphically illustrated and described in my article appearing in American Machinist previously referred to. Suffice to say, therefore, that the point of the describing generating principle of action must move along a line tangent to and uniform with the rotary movement of the evolute. In the case of the inclined plane of the moulding generating principle, the inclined plane must move uniformly along a line tangent to and with the rotary movement of the pitch circle. You will note that in the latter principle, if the inclined plane were disposed perpendicular to the tangent line aforesaid, and moved with the same uniformity as the inclined plane, the principle of action would be changed from that of moulding generating to that of describing generating. In the describing generating the measure of the movement of the point for one turn of the evolute will correspond and be equal to the perimeter of the evolute. In the moulding generating principle having the inclined plane the movement of this plane for one turn of the pitch circle must equal the measure of the perimeter of the pitch circle. The resultant involute generated by the point of the describing generating principle will have a lead, therefore, equal to the perimeter of the evolute; whereas, in the moulding generating principle, the involute generated by the inclined plane will have a lead equal to the measure of the perimeter of an evolute circle smaller in diameter than the diameter of the pitch circle selected and is determined by the pitch circle diameter multiplied by the cosine of the pressure angle.

The angle of the wedge member 20 of the present invention may be determined very easily by means of the rightangle triangle, Fig. 9, in which the measure of the hypothenuse is equal to the pitch circumference of the disc member 17, on the work spindle 15, designated by the letter $c$. In other words, the measure of the length of hypothenuse $c$ is equal to the measure of the perimeter of the disc 17 on work spindle 15, and side $a$, opposite the angle, has a measure of length equal to the measure of the perimeter of the pitch circle of the work or cutter; hence the sine of the angle A of the wedge 20 equals the measure of the circumference of the pitch circle of the work or cutter divided by the measure of the perimeter of disc 17 on the work spindle. The equation takes the following form:

The sine of angle A equals $\dfrac{a}{c}$

Let it be assumed that the work spindle 15 is given an oscillating rotary motion uniform or nonuniform as heretofore described. The disc 17 will cause the wedge 20 to move in a rectilinear path on the abutment slide 21, thus slide 10 will be caused to move in a rectilinear path on the swivel member 9, and the rectilinear motion of said slide 10, with respect to the rotary motion of the work sleeve spindle 15, will depend upon the size of the disc 17 and the angle A of the wedge 20. It follows, therefore, that if, as heretofore referred to, a uniform rotary motion is given to the disc 17, slide 10 will move uniformly in a rectilinear path determined by the ratio between the elements 17 and angle A of the wedge member 20. If, however, nonuniform motion is given to disc 17, the motion of slide 10 will be nonuniform but nevertheless correlated therewith and in direct ratio of the elements 17 and 20.

One end portion of the cable 13, being secured to the end portion of the slide 10, having a weight attached to the other end of said cable 13, will cause slide 10 to move in the direction of the arrow 14, Fig. 1, to a position of rest, determined by the tension of the tape members 35, rolling upon and connecting the members 17 and 20 to form a unitary part, hence, when force is applied to oscillate the work sleeve spindle 15, slide 10 is actuated to move to lift the weight at the end of the cable 13, and when the motion of the work sleeve spindle 15 is reversed to the opposite direction, the weight continues to exert its component of force, said force being always in the same direction and having the same magnitude, it will be arrested by the inextensible tape member 35, which combined with the inherent component of force exerted by the wedge in a vertical direction, results in the proposition in the functional operation of the means herein disclosed in a machine of the character set forth, that there will be no resultant lost motion because of the natural inherent force of the wedge to move vertically as opposed to the force of the slide in an angular direction thereto.

The weight on the end of the cable 13 exerting a component of force always in one direction, will cause the slide 10 to seek its lowest possible position to the right of the person viewing the drawing, Fig. 1, arrested only by the position of the bell crank 31 and the connecting rod 32. This force being constant will cause the work spindle 15 to exert a constant rotative force opposite to the direction indicated by the arrow 33, to be overcome only by positive mechanical means applied to the work spindle 15, through the medium of the members of the connecting rod 32 and the bell crank 31, in the application of the present invention to the machine referred to.

If now, the machine is operating, the work spindle oscillating and the slide reciprocating as described, it is obvious that an additional independent rectilinear movement will be given to the slide 10, if the hand-wheel 28 is rotated as heretofore referred to. The object of giving this independent movement to the slide is fully set forth in the copending application for patent herein referred to. It is thought, therefore, that it will only be necessary to state that this movement is necessary when grinding gear shaper cutters to enable the flanks of the teeth to be controlled with respect to fullness of the flanks of the gear shaper cutter teeth or nonfullness as the case may be. This flank fullness is controlled by the relative movement of the slide 10 with respect to the fixed position of the cutting element 8. If no flank fullness is required it is only necessary to allow slide 10, which carries the work spindle 15, to move further to the right of the person viewing the drawing, Figs. 1, 2 and 3. If, however, flank fullness is required, it is merely necessary to cause slide 10 to reverse its movement and return to its former position before the center O, of the work spindle 15, coincides with the cutting face C. This is controlled by adjustment to the proper position by means of tail stock spindle 22. In grinding gear shaper cutters which may have helically arranged teeth, it is necessary to swivel the cutting element 8, about a vertical axis coincident with the cutting face C. This is provided for in the present invention by means of the swivel upright base 2. This base may be swivelled on bed 1 in a plane perpendicular to the plane of the drawings, Figs. 1 and 2, to any desired angle corresponding to the helical angle of the teeth of the gear shaper cutter, plus or minus any additional amount desired for clearance to said teeth, and when so swivelled, said swivel base 2 may be locked in that position by means of the bolts B, passing through an elongated slot in said swivel base 2, and having threaded engagement with bed 1. It was previously stated that the invention herein disclosed is applicable to grinding machine set forth, wherein swivel member 9 is disposed to the pressure angle desired in the gear when operating on the moulding generating principle of action, to the end that the cutting face C of the cutting element 8, with the sliding-ways W, of the slide 10, form an angle equal to to the complemental pressure angle desired in the cutters or gears. It is only necessary, therefore, where the pitch diameter remains fixed in the gear or cutter, to obtain a different pressure angle in the gear or cutter by merely disposing swivel member 9 to that angle of pressure. This is accomplished by any suitable means; for example, means illustrated and described in copending application herein referred to.

Having thus described my invention I claim:

1. In a machine of the character set forth, a cutting element, means to rotate said cutting element, a slide, a work spindle on the slide, means to oscillate said work spindle, a disc mounted on said work spindle, a fixed abutment, a wedge member having tangential contact with said disc and slidable on said abutment, and a plurality of tapes under tension connecting said disc and said wedge member.

2. In a machine of the character set forth a cutting element, means to rotate said element, a slide adapted to be reciprocated in a plane forming an angle with the face of the cutting element substantially equal to the complemental angle of pressure, a swivel member carrying said slide provided with means adapting it to be adjusted to said complemental angle of pressure, a work spindle carried by said slide, a disc fixedly secured to said work spindle, an abutment, a wedge member having tangential contact with said disc and adapted to reciprocate on said abutment, said disc member and wedge member being provided with a plurality of tape members adapting said wedge member to roll upon said disc member without slippage.

3. In a machine of the character set forth, a cutting element adapted to be rotated on its axis, a work spindle, a slide upon which the work spindle is mounted, adapted to be reciprocated in a plane disposed to the angle of pressure with respect to the axis aforesaid and to the complemental angle of pressure with respect to the cutting element, means to adjust said slide to reciprocate at any given angle of pressure or complemental angle of pressure aforesaid, a wedge member, a disc fixedly secured to said work spindle having tangential contact with the wedge member, an abutment member having a surface with which said wedge member engages, which lies in a plane forming an angle with the axis of the cutting element, a plurality of tapes connecting said wedge member and said disc member, means to oscillate said work spindle whereby said wedge member is caused to reciprocate to effect the reciprocation of the slide referred to.

4. In a machine of the character set forth, a cutting element, a slide disposed at an angle thereto, a work spindle mounted in said slide, a disc mounted on said work spindle, a wedge member with which said disc has tangential contact, an abutment member upon which said wedge member reciprocates, tape members connecting said disc member and said wedge member to effect a uniform rolling motion of said disc member on said wedge member, means to oscillate the work spindle to cause said wedge member to reciprocate whereby the slide carrying the work spindle is reciprocated, said rotary motion of the work spindle and said reciprocating motion of the work spindle carrying slide being correlated and of precise magnitude, whereby an involute curve is generated on the teeth of the work by the cutting element, and means to adjust said work spindle slide with respect to the cutting element while the machine is in operation to control the magnitude of the measure of the flank fullness of gear shaper cutters and the like.

5. In a machine of the character set forth, a cutting element adapted to rotate on its axis, a swivel member adapted to be swivelled to the angle of pressure with respect to the axis aforesaid and to the complemental angle of pressure with respect to the cutting element, a slide mounted on said swivel adapted to be reciprocated thereon, a work spindle carried by said slide, a disc member fixedly secured to said work spindle, a wedge member adapted to have tangential contact with said disc member and adapted to be reciprocated in a direction at an angle to said axis, an abutment fixed with respect to the swivel member, inextensible tape members connecting said disc member and said wedge member with means to tension said tape members, a tail stock member fixedly secured to said swivel member provided with an adjustable spindle, said spindle being adapted to carry the abutment slide member.

6. In a machine of the character set forth, an adjustable swivel member, a slide mounted thereon adapted to carry a work spindle, a disc fixedly secured to said work spindle, a wedge member having tangential contact with said disc member, an abutment with which said wedge member engages, a slide member carrying said abutment, a tail stock member fixedly secured to said swivel member, an adjustable spindle carried by the tail stock and fixedly secured to said slide member, inextensible tape members connecting said disc member mounted on said wedge member, means enabling said tape members to be tensioned, a cutting element adapted to be rotated on an axis, means to adjust the plane of the face of said cutting element about an axis disposed at right angles to its axis of rotation to the helical angle of the teeth of the work plus or minus any increment amount desired for clearance to provide a cutting edge in helical gear shaper cutters, means to rotate said cutting element and means to oscillate the work spindle, a cable fastened to one end of said side, and a weight fastened to the other end adapting said weight to exert a uniform component of force at the tangential point of contact between the disc member and wedge member aforesaid.

7. In a machine of the character described, a slide having a work spindle thereon, a guideway for the slide, a disc fixed to the work spindle, a rigid member extending at an angle to the guideway, and means including tapes connecting said disc to said member and an abutment with which said member has sliding engagement for moving said member bodily without angular movement in a direction transverse to said guideway and for constraining said spindle to a rolling movement along said member.

8. In a machine of the character described, a slide having a work spindle thereon, a guideway for the slide, a disc fixed to the work spindle, a rigid member extending at an angle to the guideway, and tapes connecting said disc to said member for constraining the spindle to a rolling movement along said member, an abutment having a face extending at an angle to said guideway with which said member engages, and means for oscillating said spindle to reciprocate said slide in its guideway and said member on said abutment.

9. In a machine of the character described, a slide having a work spindle thereon, a guideway for the slide, a disc fixed to the work spindle, a rigid member extending at an angle to the guideway, and means including tapes connecting said disc to said member for constraining the spindle to a rolling movement along said member and means including an abutment upon which said member slides for holding said member against angular movement and restraining the same against movement longitudinally of the guideway.

10. In a machine of the character described, a slide having a work spindle thereon, a guideway for the slide, a disc fixed to the work spindle, a rigid member extending at an angle to the guideway, means for guiding said member for linear movement bodily toward and from the guideway and for maintaining the same at a fixed angle to the guideway, and tapes connecting said disc to said member to impart to the disc a rolling movement along said member.

11. In a machine of the character described, a cutting element, a work supporting element, and means for imparting a relative movement to said elements, one with respect to the other, laterally with respect to the axis of the work and angularly about the axis of the work comprising a rigid member extending at an angle to the direction of lateral movement, a disc fixed to the angularly movable element, a rigid member extending at an angle to the direction of lateral movement, and means for moving said member bodily in a direction transverse to its length without angular movement and for maintaining the same at a fixed distance from the axis of the work including tapes connecting said member to said disc and an abutment fixed with respect to the laterally movable element with which said member engages.

Signed this 22nd day of January, 1927.

OLIVER G. SIMMONS.